W. J. HESSELN.
TWO FLUID GALVANIC CELL.
APPLICATION FILED NOV. 23, 1910.

1,032,830.

Patented July 16, 1912.

UNITED STATES PATENT OFFICE.

WILHELM JOHANN HESSELN, OF ARNHEIM, NETHERLANDS.

TWO-FLUID GALVANIC CELL.

1,032,830. Specification of Letters Patent. Patented July 16, 1912.

Application filed November 23, 1910. Serial No. 593,916.

*To all whom it may concern:*

Be it known that I, WILHELM JOHANN HESSELN, a citizen of the Kingdom of the Netherlands, residing at Arnheim, Netherlands, have invented certain new and useful Improvements in Two-Fluid Galvanic Cells, of which the following is a specification.

This invention relates to two-fluid galvanic cells having a carbon diaphragm serving also as an electrode, and it has for its object to render the diffusion between the two liquid electrolytes automatically proportionate to the varying requirement of the cell, that is to the varying consumption of electric current, and to stop the diffusion as far as possible while the cell is at rest. This object is effected according to this invention by utilizing the warm gases and vapors generated by the electro-chemical action to produce pressure acting upon the liquid electrolyte. This utilization of the gases and vapors may be effected alone or in conjunction with capillary material lying against the sides of the diaphragm or situated within the insertions.

Figure 1:
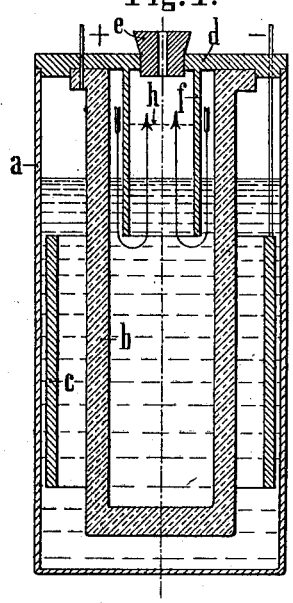
Figure 2:
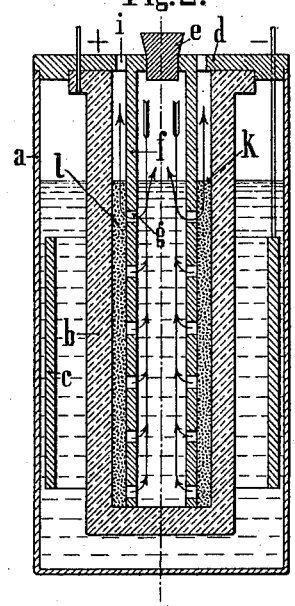

Two ways of carrying out this invention are illustrated by way of example in the accompanying drawings in which:

Figure 1 is a vertical section of a cell embodying the utilization of pressure and vacuum only; and Fig. 2 is a similar view of a cell in which, capillary action is employed in addition to the utilization of pressure and vacuum for regulating the diffusion of the electrolytic liquid.

In both figures, $a$ is the outer vessel of the cell, $b$ the carbon diaphragm (serving also as an electrode), $c$ a metal electrode of zinc, iron, aluminium or other suitable metal, and $d$ is a lid with a stopper $e$.

As shown in Fig. 1, $f$ is a tubular or other hollow insertion, preferably of glass, vulcanite, celluloid, earthenware, but which may also be of carbon or the like; it is arranged on the underside of the lid and dips to a greater or less depth into the electrolyte. The warm gases which are generated on the discharge of current, mostly along the sides of the carbon electrode $b$, rise between the insertion $f$ and the carbon electrode $b$, and force here the liquid downward so that it rises within the insertion $f$ to say, the level indicated by the line $h$; this action taking place more or less quickly according to the consumption of current and the resulting greater or less generation of gas and heat. Now since this pressure causes the inner level of the liquid to be higher than the level of the outer liquid surrounding the metal electrode, the pressure due to this greater head of liquid will cause the diffusion of the liquid contained within the carbon electrode, to be more or less accelerated and proportionate to the varying requirements. As soon as the consumption of current ceases in whole or in part, the generation of gas and heat will also cease in whole or in part, and thereby cause the raised column of liquid in the insertion $f$ to sink again. Further, owing to the cooling of the gases and the condensation of the vapors, a certain vacuum will be produced between the carbon and the insertion $f$, which will enable the liquid (or portions thereof) that surrounds the metal electrode and now stands at a higher level, to pass back to a greater or less depth into the carbon and thus prevent the liquid contained in the carbon from diffusing or passing out from the latter while the cell is at rest.

If the aforesaid pressure action should produce a too great pressure in the carbon electrode, this pressure will be relieved by the escape of gases through the stopper $e$. In such a case however the gases must first pass through the liquid by which they are partly absorbed.

By arranging the tubular or other hollow insertion $f$ to dip to a greater or less depth in the liquid, or by making it of a greater or smaller diameter or other dimensions, the level to which the liquid is raised by the gas pressure and consequently the pressure and vacuum effects can be regulated as desired.

In the construction shown in Fig. 2, the tubular or other hollow insertion $f$ is carried down to the bottom of the carbon diaphragm, and is made pervious or is perforated in its lower portion downward from the point $g$ which is desired to be below the normal level of the liquid, for the purpose of allowing the liquid to pass through freely to the diaphragm.

When using a diaphragm vessel made in one piece, the bottom of such vessel is rendered as usual impervious by means of paraffin, varnish, or the like, except in those cases where a metal electrode is situated in front of the bottom of such vessel.

A layer $l$ of suitable porous material such as asbestos, glass wool, coarsely powdered glass or carbon, or mealy substance, is rammed in between the insertion $f$ and the sides of the diaphragm up to say, the height of the normal level $k$ of the liquid. Owing to the perviousness or perforations of the insertion $f$, this rammed porous layer readily becomes saturated with liquid and thus offers a certain resistance to the passage of the liquid through the carbon diaphragm. This resistance is only overcome by the action of the current and the chemical processes and pressure actions consequent thereon, whereby it causes the amount of liquid which is necessary at the time to pass through or diffuse.

During the operation of the cell, the generated gases and vapors rise, fill the cavity of that portion of the air-tight insertion $f$ which is impervious from say the level $g$ upward, and they then exert upon the electrolyte a pressure which is proportionate to the consumption of the current and which accelerates the diffusion or passage of the liquid through the carbon diaphragm. When the electrolyte has been depressed to the level $g$ where the pervious structure or the perforations of the insertion $f$ begin, the gases are able to escape at $k$ through the layer saturated with liquid, or through the holes $i$ in the lid.

It is impossible for the gases and vapors to escape at $g$ or at $k$, without filling the upper cavity of the insertion $f$, and therefore exerting their pressure effects therein, because the capillary action of the saturated layer offers a very great resistance to the rise of the liquid in it, and a consequent premature escape at $g$ or $k$, if in fact it does not render such rise impossible. The gases and vapors are therefore compelled to rise in the liquid in the insertion $f$, and to act from above in the hereinbefore described manner before they can escape. This effect is further aided by the circumstance that the portion of porous material situated between $g$ and $k$, continually absorbs fresh liquid from below so that the liquid is forced by the escaping gases up past the level $k$, whereby the opening $g$ for the escape of the gas under excessive pressure is always kept covered. The capillary action of the porous layer has also the advantage that the porous material will remain saturated throughout its height almost so long as there is still any electrolyte in the insertion $f$. In this manner the walls of the diaphragm will remain covered from top to bottom with liquid until the electrolyte contained in the cell is almost entirely consumed, whereby a uniform current effect is produced also in the vertical direction. When the cell is at rest, the pressure actions cease again, so that owing to the cooling and consequently produced vacuum, the liquid (or portions thereof) which surrounds the metal electrode and has been forced upward to a greater or less extent by the operation of the cell, can now pass back into the diaphragm and thus prevent diffusion while the cell is at rest.

The invention may be carried out in many other forms differing more or less from the constructional examples shown in the accompanying drawings. For instance the entire space within the carbon diaphragm may be filled with porous material up to say the level $g$, and the entire internal system may be made removable. In such a case however owing to the capillarity of the porous material, the replacing of the used electrolyte by fresh liquid is rather more difficult.

In the construction shown in Fig. 1, the insertion $f$ may likewise be carried down to the bottom and be made pervious or perforated below the normal level of the liquid; it may also be provided independently with porous material for the purpose of utilizing this porous material saturated with liquid to cause the contained electrolyte to pass as much as possible through the carbon diaphragm in the manner described with reference to Fig. 2.

It is immaterial whether the diaphragm of carbon or graphite is of round, polygonal or other shape, and whether the metal electrode with its appurtenant liquid electrolyte is situated within or without the carbon electrode, and also whether in the case of large carbon diaphragm vessels, there are a number of the insertions $f$.

In the case of electrolytes which give off little or scarcely any gas or heat, it is advisable to add to them a small percentage of nitric acid, hydrochloric acid or the like to promote the generation of gas, and consequently of pressure.

A special advantage of utilizing the hereinbefore described pressure actions and capillary effects and the resulting automatic regulation of the diffusion, consists in that not only can weak, strong and even concentrated mixtures of liquids be employed with equally good results, but also the well known mixtures of sulfuric acid, nitric acid, hydrochloric acid and the like, with the addition of chromates, bichromates, permanganates, oxidizing nitrates, chromic acid and the like.

Existing constructions of cells in which the electrolytes remain at rest and work solely with the ordinary diminution of diffusion that increases in working, the employment of the above mentioned electrolyte mixtures is possible with some success only within certain concentration limits of the acids and with the use of small quantities of oxidizing agents, because otherwise the added oxidizing salts and their compounds with the acids are very apt to choke the pores of the diaphragm and hinder the current effects too much. In cells constructed according to this invention those drawbacks occur either not at all or not to any disturbing extent, because the electrolytes are maintained in continual movement by the pressure actions and are, as it were, pushed to-and-fro so that no choking of the diaphragm can occur. Even with the use of nitric acid alone, which as is well known, diffuses through carbon with more difficulty than sulfuric acid, it is possible to obtain good results with any desired degree of concentration, owing to the said pressure actions.

What I claim is:

1. In a two-fluid galvanic cell having a carbon diaphragm and electrode, a hollow insertion in the carbon diaphragm space dipping into the liquid of the cell when in operation so as to form a liquid-sealed cavity within the cell, allowing accumulation of gases and vapors generated during the operation of the cell for the purpose of influencing the diffusion of liquid through the diaphragm.

2. In a two-fluid galvanic cell having a carbon diaphragm and electrode, a tubular insertion inside the carbon diaphragm space dipping into the liquid within said space during the operation of the cell, and a metal electrode outside said carbon diaphragm space.

3. In a two-fluid galvanic cell having a carbon diaphragm and electrode, a tubular insertion in the carbon diaphragm space dipping into the liquid within said space and permeable to liquid in its lower part below the point which normally occupies the level of the liquid during operation.

4. In a two-fluid galvanic cell having a carbon diaphragm and electrode, a hollow insertion in the carbon diaphragm space, dipping into the liquid within said space during operative condition of the cell so as to form a liquid-sealed cavity therein, and absorbing material in contact with said hollow insertion.

5. In a two-fluid galvanic cell having a carbon diaphragm and electrode, a hollow insertion in the carbon diaphragm space, dipping into the liquid within said space during operative condition of the cell so as to form a liquid-sealed cavity therein, and absorbing material between said hollow insertion and diaphragm.

6. In a two-fluid galvanic cell having a carbon diaphragm and electrode, a tubular insertion in the carbon diaphragm space reaching down to the bottom of said space and permeable to liquid in its lower part below the point which normally occupies the level of the liquid during operation, and absorbing material between said tubular insertion and said diaphragm.

In testimony whereof, I affix my signature in presence of two witnesses.

WILHELM JOHANN HESSELN.

Witnesses:
 HENRY HASPER,
 WOLDEMAR HAUPT.

Copies of this patent may be obtained for five cents each, by addressing the "Commissioner of Patents, Washington, D. C."